United States Patent
Quintero-de-la-Garza (10) Patent No.: US 7,065,545 B2
(45) Date of Patent: Jun. 20, 2006

(54) COMPUTER METHODS OF VECTOR OPERATION FOR REDUCING COMPUTATION TIME

(76) Inventor: Raul Gerardo Quintero-de-la-Garza, Asturias 707-1 Cumbres Sexto Sector, Monterrey, Nuevo Leon 64610 (MX)

( * ) Notice: Subject to any disclaimer, the term of this patent is extended or adjusted under 35 U.S.C. 154(b) by 800 days.

(21) Appl. No.: 10/140,788

(22) Filed: May 7, 2002

(65) Prior Publication Data

US 2003/0212723 A1 Nov. 13, 2003

(51) Int. Cl.
*G06F 7/38* (2006.01)

(52) U.S. Cl. ........................................ 708/446; 708/607
(58) Field of Classification Search ................ 708/446, 708/520, 607
See application file for complete search history.

(56) References Cited

U.S. PATENT DOCUMENTS

| | | | |
|---|---|---|---|
| 4,787,057 A | 11/1988 | Hammond | |
| 4,914,615 A | 4/1990 | Karmarkar et al. | |
| 5,267,185 A | 11/1993 | Akabane et al. | |
| 5,301,342 A | 4/1994 | Scott | |
| 5,319,586 A | 6/1994 | Gupta et al. | |
| 5,392,429 A | 2/1995 | Agrawal et al. | |
| 5,490,278 A | 2/1996 | Mochizuki | |
| 5,548,798 A | 8/1996 | King | |
| 5,905,666 A * | 5/1999 | Hoffman et al. | 700/99 |
| 6,078,938 A | 6/2000 | Pan et al. | |
| 6,085,213 A | 7/2000 | Oberman et al. | |
| 6,223,198 B1 | 4/2001 | Oberman et al. | |
| 6,230,101 B1 | 5/2001 | Wallis | |
| 6,694,343 B1 * | 2/2004 | Forrest et al. | 708/520 |

\* cited by examiner

*Primary Examiner*—Chuong D Ngo
(74) *Attorney, Agent, or Firm*—Darren M. Simon; A. Thomas S. Safford; Frommer Lawrence & Haug LLP (57) ABSTRACT

A computer method of vector operations for calculating the inverse of a general square matrix and for solving linear equations systems. The invention comprises a new method of factorization and executing multiply-add operations useful for effecting dot-product operations of one-dimensional vectors. This new method reduces the computation time over computers programmed to use prior art methods.

6 Claims, 4 Drawing Sheets

COMPUTER METHODS OF VECTOR OPERATION FOR REDUCING COMPUTATION TIME

FIELD OF THE INVENTION

The present invention relates to computational methods for a computer to calculate the dot product of two vectors, for obtaining the inverse of a general square matrix and for solving square linear equation systems, which perform the desired operations more rapidly than the methods of the prior art. These methods find application in a number of fields; as in computational models of physical systems such as electric and electronic circuits, digital simulators and image rendering.

BACKGROUND OF THE INVENTION

The calculation of the inverse of a matrix is used in many physics and mathematical analyses. For example, inverse calculations are used in the analysis of physical structures and electrical networks. Linear equations occur frequently in all branches of science and engineering, and effective methods are needed for solving them. Furthermore, many science and engineering problems lead not to a single equation, but to a system of equations. The object of solving the system is to find values of all unknowns that simultaneously satisfy all equations in the system.

The inverse of a matrix is defined in this manner: If [A] and [B] are square matrices such that they satisfy [A][B]=[I], where [I] is the n×n identity matrix, then [B] is called the inverse of [A] and we write $[B]=[A]^{-1}$ ([B] equals [A] inverse). If $[A]^{-1}$ exists then A is said to be nonsingular. Otherwise, we say [A] is singular. An identity matrix is defined as a square matrix in which each and every element is zero with the exception of the main diagonal, which is invariantly composed of unit elements.

The problem of solving a linear system Ax=b is central to many scientific computations. A system of m linear equations with n unknowns $x_1, x_2, \ldots, x_n$ may be represented as shown below:

$$a_{11}x_1 + a_{12}x_2 + \cdots + a_{1n}x_n = b_1$$

$$a_{21}x_1 + a_{22}x_2 + \cdots + a_{2n}x_n = b_2$$

$$\ldots$$

$$a_{m1}x_1 + a_{m2}x_2 + \cdots + a_{mn}x_n = b_m$$

The coefficients (a's) and the constant terms (b's) are real numbers. A real solution of the system is any set of real values of $x_1, x_2, \ldots, x_n$ which simultaneously satisfy the m equations.

Two systems of linear equations with the same number of unknowns are called equivalent if every solution value of either system is also a solution value of the other. An equivalent system of equations may be obtained by applying one or more of the following transformations: (a) interchanging any two of the equations; (b) multiplying any equation by any non-zero real constant; and (c) adding to any equation a multiple of another equation. To perform calculations, especially when working with a large number of coefficients, computers are used to carry out the operations as rapidly as possible.

The current methods for solving systems of linear equations can be classified into two different classes: direct techniques and iterative techniques. Direct techniques are methods that provide the answer in a fixed number of steps, subject to round-off errors created by the precision limits of digital computers. Iterative techniques start with an initial approximation to the solution and generate a sequence of vectors that converge to the solution. Direct techniques use various operations on matrices, such as addition or multiplication by a scalar, vector or another matrix. These methods have varying degrees of complexity, and the simpler methods are often limited to special cases or well-conditioned matrices. The present invention is related to direct methods for solving linear systems of equations. The applicant has found the following patents related to methods of solving linear equations systems (the content of all patents cited herein being incorporated by reference).

U.S. Pat. No. 4,787,057 to Hammond is directed to a machine-implemented method and apparatus for analyzing physical systems by performing matrix operations to solve systems of linear equations. Hammond discloses a method for loading and storing a large, sparse matrix in a form that makes it more efficiently manipulated by a plurality of interconnected processors, each having its own storage and capable of operation in a highly parallel manner. Although Hammond suggests in general that the back-substitution technique is particularly efficient when solving a system of the type A X=Q, when A is in the triangular form, either upper or lower, he does not suggest or disclose any method for transforming matrix A into a triangular matrix. Rather, Hammond simply states that "techniques for transforming a linear system of the general form to a system of the triangular form are well known" and does not give any detail of how to perform such operations (much less how to do so in a shorter time as compared to standard methods). Thus, Hammond deals with a technique for mapping a large, sparse matrix into a multiprocessor computer architecture for efficient and rapid computations on such a matrix. Whereas, the present invention is based on a new method for effecting the triangularization of matrices in less time, thereby making equation solution more efficient in a monoprocessor or multiprocessor computer.

Other prior art references which generally relate to methods and apparatus for operations of matrices and vectors are: U.S. Pat. No. 4,914,615 to Karmarkar et al.; U.S. Pat. No. 5,267,185 to Akabane et al.; U.S. Pat. No. 5,301,342 to Scott; U.S. Pat. No. 5,319,586 to Gupta et al.; U.S. Pat. No. 5,392,429 to Agrawal et al.; U.S. Pat. No. 5,490, 278 to Mochizuki; U.S. Pat. No. 5,548,798 to King; U.S. Pat. No. 6,078,938 to Pan et al.; U.S. Pat. No. 6,085,213 to Oberman et al.; U.S. Pat. No. 6,223,198 to Oberman et al.; and U.S. Pat. No. 6,230,101 to Wallis. All of the above references refer to solving linear equations systems, but they deal with hardware configurations, methods of manipulating the digital representations of matrices in the memory of computers, or to particular applications where the solution of the equations is carried out by iterative or direct methods known in the art. None of the references teaches or suggests a method for shortening the computing time spent in the solution of simultaneous linear equations which is applicable to any type of computer.

Typically, linear equation systems have been solved by the general two-step method of: (1) triangularization of a matrix, i.e. transforming the elements of the matrix so that it becomes a triangular matrix, in other words, an upper or lower matrix, meaning that the elements of the matrix below or above the main diagonal are zeros, and (2) backwards substitution of the elements of the matrix in order to calculate the values of the unknowns of the equations or the inverse of the matrix. These prior art methods use standard techniques for the triangularization step; for example, the well-known Gaussian method.

In contrast, it has been found that the time required by a computer programmed to solve an equation system is shortened by utilizing the method of triangularization of the present invention.

The second step, i.e. backwards substitution of the elements of matrix [A], is known in the art and comprises the operations needed for sequentially calculating the values of the vector of unknowns $[x_i]$ by substituting the values of $[x_j]$ already known in each row of the triangular matrix in order to find the other values of the vector [x].

However, the methods of the present invention shorten the time needed for transforming a matrix into a triangular matrix. This may be attributed, without intending to link the merits of the invention to this explanation, to the fact that manipulations of the elements of the matrix are more efficiently carried out in a column by column basis of each row instead of manipulating all elements of the matrix for each element being transformed.

In performing the above basic steps for triangularization of a matrix, there are many vector dot product operations. Therefore, a more rapid method of carrying out these vector multiplications is very desirable. The present invention also comprises a new method for performing the dot product of two vectors in less time than the methods of the prior art.

The dot product of two vectors may be exemplified as follows: Assuming vector A equals (x1, x2, x3) and vector B equals (y1, y2, y3) then the dot product of A·B equals x1y1+x2y2+x3y3. When the above algorithm is expressed in a computer-readable code and executed in a computer, the multiplication and addition is executed n times (n being the number of elements of each vector) and the final value of the accumulated partial results is the dot product of the two vectors, which is a scalar number. This direct approach to the calculation of the dot product of two vectors requires considerably more time than if the calculation is performed according to the method of the present invention.

Similarly, the sum of products or quotients of multiple vector elements, constants or functions can be calculated using the aforementioned method, by substituting the multiply operation for the expression corresponding to the sum of products or quotients, i.e. a[i]*b[i]*c*f(i); wherein a and b are one dimensional vectors, c is a numeric constant and f(i) is the result of evaluating function f with the value of each element [i].

U.S. Pat. No. 4,884,232 to Schlunt describes a digital circuit designed to execute a parallel algorithm to compute the dot product of large dimensional vectors at very high speed. The invention of Schlunt is directed to the circuitry rather than a particular computer programming method for performance of such dot-product operations (especially one with improved time performance).

U.S. Pat. Nos. 6,085,213 and 6,223,198 also involve calculating the dot product of vectors, but these patents are directed to a method for operating a microprocessor and a microprocessor architecture and a digital circuit adapted to execute the known method in parallel instead of serially. However, they do not disclose decreasing the time involved in the calculation of the dot product of two vectors by programming a computer in a manner such that the total number of multiplication and addition operations are subdivided into a subroutine performing such operations in groups of certain size and then adding the partial results of the groups in order to obtain the final value of the dot product.

The method of the invention requires fewer calculations than the methods of the prior art, which is very useful in view of the widespread application of this operation. Therefore a need exists to decrease the time consumed by programmable computers in performing repetitive vector dot product operations. Since there are numerous computer applications where operations on vectors and matrices are essential, there is a need for efficient computer methods and systems to speed up calculations involving matrices.

SUMMARY OF THE INVENTION

The objects of the present invention are achieved in general by providing computer methods for calculating the inverse of a square general matrix or for solving square linear equations systems wherein a preferred embodiment of the method comprises two main steps, namely (a) triangularization of the matrix; and (b) backwards substitution of the elements of the matrix.

The first step, triangularization, comprises converting an extended matrix $[A|I_{N \times N}]$ (when calculating the inverse) or an extended matrix $[A|B]$ (when solving a linear equation system with a single right side) into a triangular system [U] or [L] wherein U is an upper unit triangular matrix and L is a lower triangular matrix.

The triangularization step, according to the invention, is made by performing the dot product between a vector [K], calculated according to the formula shown below, and each column vector A[:,i], (as expressed in column notation indicating a column vector which comprises column i of matrix A). After these operations, the values of the elements of each row are transformed so that the extended matrix becomes a triangular matrix. This vector [K] is of variable length. For stage 2 (e=2) [K] is of length 2, (i.e. [K] has 2 elements and so forth).

$$K_n = \begin{cases} 1 \leq n < e; & -a_{en} - \sum_{i=1}^{n-1} (a_{in} * K_i) \\ n = e; & 1 \end{cases}$$

The second step, backwards substituting the elements of the matrix [A], is performed using the formula shown below (this operation is described considering the system Ux=b, wherein U is an upper triangular matrix, x is a solution vector and b is a constant vector):

$$x_i = \frac{\left(b_i - \sum_{j=i+1}^{n} u_{ij} x_j\right)}{u_{ii}}$$

for j=i+1, i+2 . . . n, and i=n−1, n−2 , . . . 1.

After the above calculations are completed, the vector [x] holds the solution of the system. This operation can be extended to multiple right hand sides, and, if the constant matrix [B] is a lower triangular matrix obtained from an identity matrix, it can be used to calculate the inverse of matrix [A].

Another aspect of the invention is a computer method for performing the dot product of two vectors having n elements, which comprises the steps of selecting a number m of partial multiplication operations and additions to be carried out in a single line of program code; storing the partial results of the m multiplication and addition operations; and summing up the partial results to obtain the value of the dot product (wherein m is a number smaller than n), whereby the dot product value is obtained more rapidly than if the computer is programmed to sequentially perform n times only one multiplication operation followed by the accumulation of results of the multiplication operations.

Other objects and advantages of the invention will in part be obvious and will in part be apparent from the specification and the drawings.

BRIEF DESCRIPTION OF THE DRAWINGS

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF THE PREFERRED EMBODIMENTS

The present invention comprises a computer method related to the calculation of the inverse of a given matrix [A] or to the calculation of the solution of a linear equation system of the form [A][x]=[b] or the form [A][X]=[B]. Given a matrix [A], we denote the element at row i, column j as $a_{ij}$. Vector [K], as further explained in this application, denotes a one-dimensional data vector containing constants calculated during the execution of the computer code.

Figure 1:
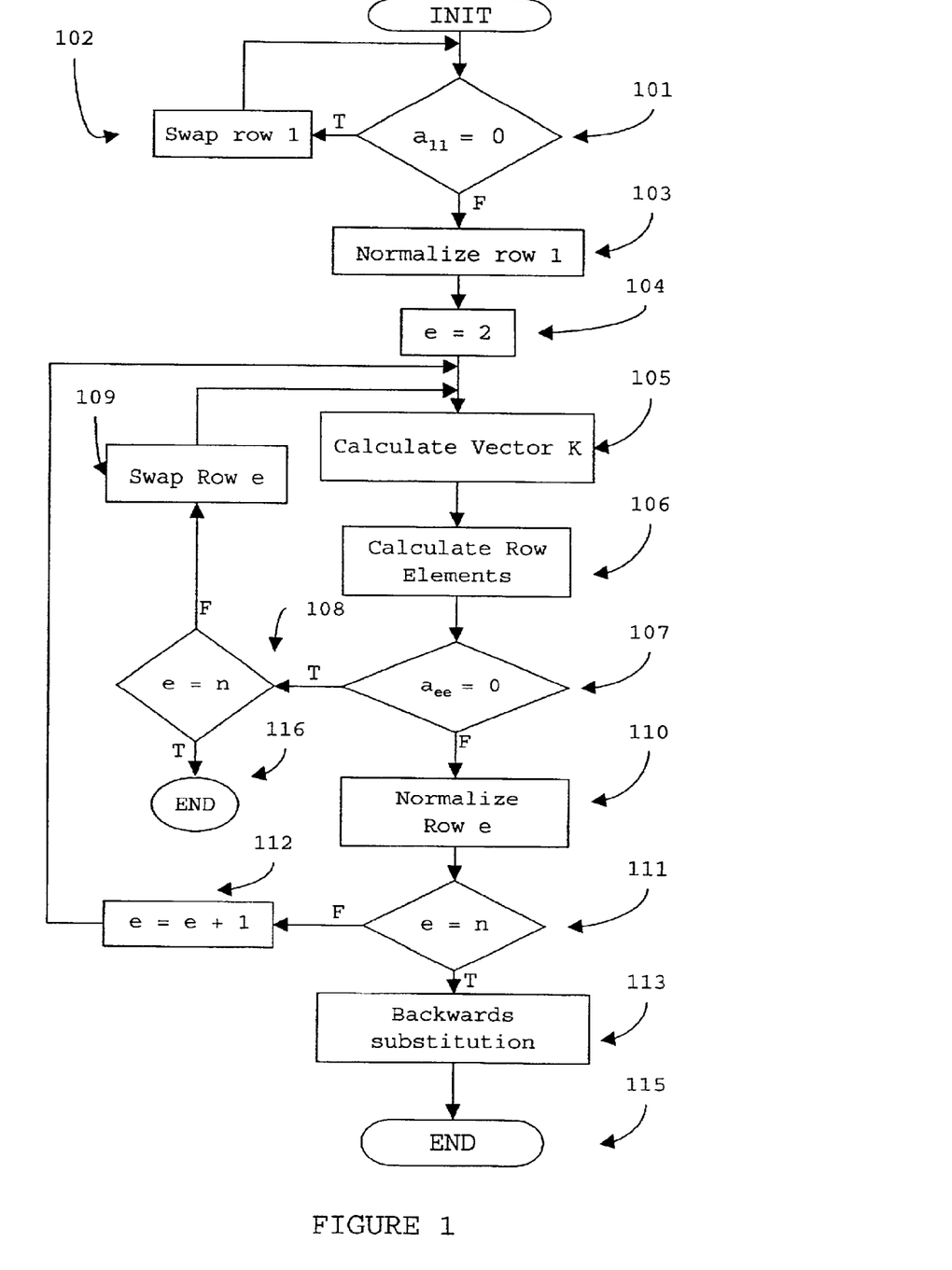
FIG. 1. shows a flowchart of a first embodiment of the invention used either for calculating the inverse of a matrix or for solving a system of linear equations.

Reference is made to FIG. 1, which shows a flow chart of a first embodiment of the invention, also referred to herein as method 1, and the steps that must be followed to correctly apply the aforementioned method in programming code to be executed by the computer according to the spirit and scope of the invention. A square matrix [A] of dimension n×n, has n rows. These rows are considered to be numbered from 1 to n for ease of reference. The calculations of the method of the invention are made using an extended matrix. This extended matrix is denoted as [A|I], and is formed by appending an identity matrix of the same order of the original matrix to its right. For example a 3×3 extended matrix would be represented as:

$$[A|I] = \begin{bmatrix} a_{11} & a_{12} & a_{13} & | & 1 & 0 & 0 \\ a_{21} & a_{22} & a_{23} & | & 0 & 1 & 0 \\ a_{31} & a_{32} & a_{33} & | & 0 & 0 & 1 \end{bmatrix}$$

Extended matrices can also be formed by appending a non-square, non-identity matrix, the only requisite is that this appended matrix had the same number of rows as the original matrix. This is done for the purpose of solving a linear equation system, be it with one right-hand side (appending a one-dimensional vector) or multiple right-hand sides (appending a matrix).

Steps 101 and 102 are programmed to prevent the computer from working with a singular matrix. Step 101 verifies that the first element of the first row of the matrix is a non-zero element. If this is not true, step 102 exchanges row 1 with another row. This second row can be chosen arbitrarily or by following a series of steps, which guarantee that the first element of the exchanged row is a non-zero element. If each matrix row has a zero-valued first element the matrix is singular and can not be solved, nor can its inverse be calculated.

For calculation of the inverse of a matrix, after a row with a non-zero first element has been found, the LU (lower/upper) factorization process starts. The goal of the computer program is the transformation of the original extended matrix into an upper (or lower) extended matrix. At the end of the method, for every row x, the elements of columns to the left of element $a_{xx}$ will be zero, the element at column x will be 1, and the rest of the elements are constants, i.e. after the LU factorization a 3×6 extended matrix would become:

$$\begin{bmatrix} 1 & a'_{12} & a'_{13} & | & c_{11} & c_{12} & c_{13} \\ 0 & 1 & a'_{23} & | & c_{21} & c_{22} & c_{23} \\ 0 & 0 & 1 & | & c_{31} & c_{32} & c_{33} \end{bmatrix}$$

Step 103 of the flowchart is the normalization of the first row of the matrix (with a nonzero first element) This is done following the aforementioned procedure. In this case normalization of row 1 is calculated by dividing each element of row 1 by element $\alpha_{11}$.

Step 104 involves the initialization of a variable e; this variable will indicate the row that is being processed by the method. As such, this variable will be used as a reference in various calculations to indicate which row will be affected by the calculations, and to reference elements of the matrix relevant to the aforementioned calculations.

Operation 105 involves the calculation of elements of a vector K of variable length. This vector holds information necessary for the rest of the calculations. This K vector is of variable length. For stage 2 (e=2), k will be of length 2 (K has 2 elements). It will be evident to those skilled in the art, that vector K may have a fixed length by filling out the remaining elements with zeros without affecting the calculation. Calculation of the elements of the aforementioned vector [K] is performed by applying the following formula:

$$K_n = \begin{cases} 1 \le n < e; & -a_{en} - \sum_{i=1}^{n-1} (a_{in} * K_i) \\ n = e; & 1 \end{cases}$$

Operation 106 involves the calculation (or updating) of the new row elements. The objective of this operation is to actualize the new value of the elements of row e of the matrix. This calculation is done on a column by column basis by calculating the dot product between vector [K] and the column vector A[:,i], This notation indicates a column vector which comprises elements of column i of matrix [A]. The aforementioned column vector comprises the elements of column i of the matrix, from row 1 to row e, e.g. Consider the following 4×4 matrix and an e value of 3. The column vector A[:,2] is denoted as:

$$\begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \quad A[:,2] = \begin{bmatrix} a_{12} \\ a_{22} \\ a_{32} \end{bmatrix}$$

The elements $a_{en}$ are calculated with the following formula applied for each and every element of row e:

$$a_{en} = \begin{cases} n < e; & 0 \\ n \geq e; & \sum_{i=1}^{e} (a_{in} * K_i) \end{cases}$$

The next step is normalization of row e, however, it is necessary to provide means to avoid illegal mathematical operations. To this end, operation 107 compares element $a_{ee}$ with zero. If $a_{ee}$ is zero it is necessary to swap row e and to recalculate vector [K] as well as the new row elements with the aforementioned operations.

Steps 108 and 109 involve the swapping of row e. Step 108 compares the variable e with the dimension of the matrix (number of rows). In the case that row e is the last row of the matrix, the matrix is singular and its solution (or inverse) cannot be calculated. As a consequence, the method ends with an error (step 116). In the case in which e is not the last row, the swapping of rows is executed as described above.

Step 110 comprises the normalization of row e, so that element $a_{ee}$ becomes 1. Operation 111 involves comparing the current value of e with the dimension of the matrix. In the case in which row e is the last row of the matrix, the calculations have finished and the method can advance to operation 113 which performs the Backwards Substitution step. In case row e is not the last row of the matrix, operation 112 is executed and the control flow returns to operation 105. Operation 112 actualizes the value of e to advance the calculations to the next row. Finally, operation 113 calculates the solution to the system by means of the aforementioned Back Substitution algorithm. Operation 115 is the termination of the method.

Figure 2:
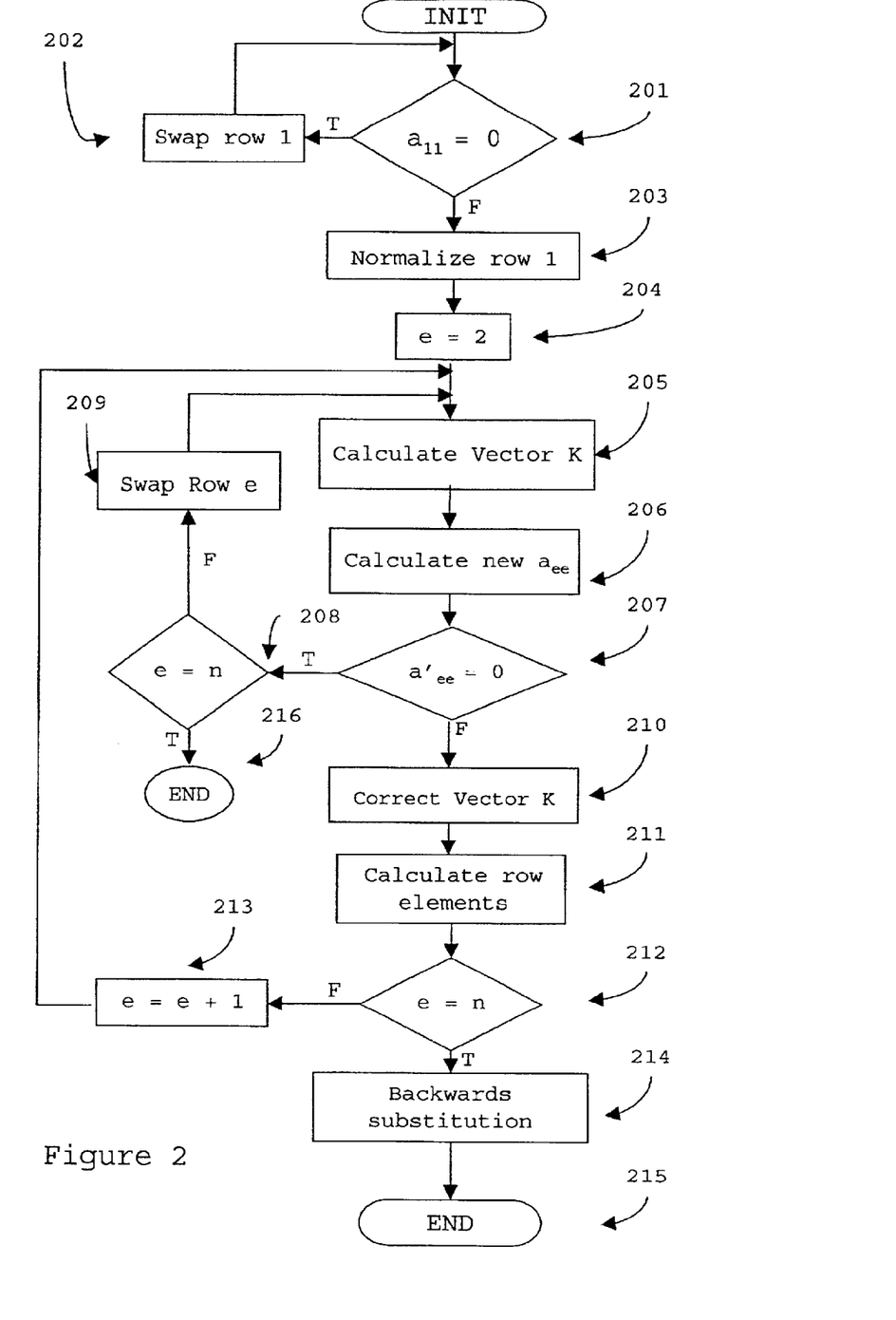
FIG. 2. shows a flowchart of a second embodiment of the invention used either for calculating the inverse of a matrix or for solving a system of linear equations.

Referring now to FIG. 2, showing a flow diagram of a second embodiment of the invention, wherein the triangularization process presents some differences as compared with the embodiment of FIG. 1.

Operations 201 through 204 operate in the same manner as analogous operations 101 through 104. Operation 205 involves the calculation of the aforementioned vector [K]. This operation is done following the same procedure and applying the same formula used in operation 105. One of the differences of method two is presented in operation 206. Operation 206 involves the calculation of element $a_{ee}$ of the matrix by applying the formula described in operation 106. This element will be further referenced as $a'_{ee}$. This is the only element calculated at this time in contrast to the calculation of all elements in method 1.

Operation 207 compares element $a'_{ee}$ to zero; this is done to prevent illegal arithmetical operations in the remaining steps. In case the element $a'_{ee}$ is equal to zero, it is necessary to swap this row with another row as described above in connection with operations 108 and 109, and to assign the flow control to operation 205. When the element $a'_{ee}$ is non-zero, operation 210 can be executed.

Operation 210 involves a modification of the elements of vector K by dividing each calculated element of vector K by element $a'_{ee}$. This step eliminates the need to normalize the row at the end of the calculations as done in method 1. After operation 211 is executed, row e will already be normalized.

Operation 211 involves the calculation or the actualization of the new row elements. The objective of this operation is to update the value of the elements of row e of the matrix. This calculation is done by performing the dot product between vector [K] and the column vector A[i,:] as described earlier in operation 106, by applying the following formula to each element of row e.

$$a_{en} = \begin{cases} n < e; & 0 \\ n > e; & \sum_{i=1}^{e} (a_{in} * K_i) \\ n = e; & 1 \end{cases}$$

Operations 212 and 213 act in the same way as corresponding operations 111 and 112 of the first embodiment.

Operation 214 involves the back substitution operation and final calculations of the solution of the linear equation system or matrix inversion.

As in the first embodiment, two terminating conditions are presented. Condition 215 signifies a successful completion of the algorithm and is executed after operation 214. Condition 216 signifies an error in the execution and, as such, a failed termination. This condition occurs when the last row of the matrix is accessed and it is necessary swap rows.

The following numeric example is included herein as a way of better clarifying the differences between the invention and the current art. This example consists of solving the following linear equation system by the aforementioned method 1, following the procedure shown in FIG. 1:

$$\begin{bmatrix} 1 & -1 & -3 & | & -6 \\ -6 & 1 & 1 & | & -5 \\ 1 & 4 & 4 & | & 5 \end{bmatrix}$$

The first step involves the normalization of the first row of the extended matrix. In this example the first element of the first row is 1, therefore row 1 is divided by one and so the values of the elements of row 1 remain the same.

The next step is to calculate the elements of vector K. Since the row to be transformed is row two, then the vector K has 2 elements which are calculated by applying the formula described above. Applying the aforementioned formula, substituting e for 2 (the current row) and substituting n for the corresponding number for every K. And considering that $K_e$ is always equal to 1 we obtain the following vector: [K]=[k1, k2]

$$K_1 = -a_{21} - \sum_{i=1}^{0} a_{iI} * K_i = -(-6) - 0 = 6$$

$$K_2 = 1$$

As can be seen in the calculation of $k_1$ the summation term has no value since the established limit is broken before the first iteration. Once vector [K] is calculated we can proceed to calculate the new values of the current row, which is row 2 denoted by $R_2$, by multiplying matrix [A] and vector [K].

$$R_2 = K^{-1}A = \begin{bmatrix} 6 & 1 & 0 \end{bmatrix} \begin{bmatrix} 1 & -1 & -3 & | & -6 \\ -6 & 1 & 1 & | & -5 \\ 1 & 4 & 4 & | & 5 \end{bmatrix}$$

$$R_2 = \begin{bmatrix} 0 & -5 & -17 & | & -41 \end{bmatrix}$$

$$A = \begin{bmatrix} 1 & -1 & -3 & | & -6 \\ 0 & -5 & -17 & | & -41 \\ 1 & 4 & 4 & | & 5 \end{bmatrix}$$

The current row 2 is now normalized by dividing the entire row by element $a_{ee}$, which in this case corresponds to $a_{22}=-5$. The extended matrix then becomes:

$$A = \begin{bmatrix} 1 & -1 & -3 & | & -6 \\ \frac{0}{-5} & \frac{-5}{-5} & \frac{-17}{-5} & | & \frac{-41}{-5} \\ 1 & 4 & 4 & | & 5 \end{bmatrix} = \begin{bmatrix} 1 & -1 & -3 & | & -6 \\ 0 & 1 & \frac{17}{5} & | & \frac{41}{5} \\ 1 & 4 & 4 & | & 5 \end{bmatrix}$$

A new vector [K] is now calculated for row 3 (e=3).

$$K_1 = -a_{31} - \sum_{i=1}^{0} a_{iI} * K_i = -(1) - 0 = -1$$

$$K_2 = -a_{32} - \sum_{i=1}^{1} a_{i2} * K_i = -(4) - (-1)(-1) = -5$$

$$K_3 = 1$$

With the vector [K] calculated the new values of the elements of row 3 are updated by multiplying the vector [K] and the extended matrix [A]. The resulting row matrix contains the new values of the elements of row 3, further denoted as $R_3$.

$$R_3 = K^{-1}A = \begin{bmatrix} -1 & -5 & 1 \end{bmatrix} \begin{bmatrix} 1 & -1 & -3 & | & -6 \\ 0 & 1 & \frac{17}{5} & | & \frac{41}{5} \\ 1 & 4 & 4 & | & 5 \end{bmatrix}$$

$$R_3 = \begin{bmatrix} 0 & 0 & -10 & | & -30 \end{bmatrix}$$

$$A = \begin{bmatrix} 1 & -1 & -3 & | & -6 \\ 0 & 1 & \frac{17}{5} & | & \frac{41}{5} \\ 0 & 0 & -10 & | & -30 \end{bmatrix}$$

The following step is to normalize the current row 3. To do this, all elements of row 3 are divided by element $a_{ee}$, which in this case corresponds to $a_{33}=-10$. The extended matrix then becomes:

$$A = \begin{bmatrix} 1 & -1 & -3 & | & -6 \\ 0 & 1 & \frac{17}{5} & | & \frac{41}{5} \\ 0 & 0 & \frac{-10}{-10} & | & \frac{-30}{-10} \end{bmatrix} = \begin{bmatrix} 1 & -1 & -3 & | & -6 \\ 0 & 1 & \frac{17}{5} & | & \frac{41}{5} \\ 0 & 0 & 1 & | & 3 \end{bmatrix}$$

The advantages of the invention can be clearly perceived at this point, because all of the zeros in every row which will define the triangular matrix are obtained in only one manipulation and operation of each row in contrast with the current art methods where each operation of a row obtains only one of the row zeros.

With the above operation, the triangularization process is complete and it is possible to obtain the solution of the linear equations system by applying back substitution to the extended matrix. The next step of the procedure is to substitute the necessary values and calculate vector x, the solution vector, using the following formula:

(In the formula shown below, U is the left side upper triangular matrix, b is the right hand vector, and x is the solution vector, as taken from Gene H. Golub, *Matrix Computations*, Johns Hopkins Univ. Press, 3rd Ed. (December 1996)):

$$x_i = \frac{\left(b_i - \sum_{j=i+1}^{n} u_{ij} x_j\right)}{u_{ii}}$$

$$x_3 = \frac{\left(b_3 - \sum_{j=4}^{3} u_{3j} x_j\right)}{u_{33}} = \frac{3-0}{1} = 3$$

$$x_2 = \frac{\left(b_2 - \sum_{j=3}^{3} u_{2j} x_j\right)}{u_{22}} = \frac{\frac{41}{5} - \left(\frac{17}{5}\right)(3)}{1} = -2$$

$$x_1 = \frac{\left(b_1 - \sum_{j=2}^{3} u_{1j} x_j\right)}{u_{11}} = \frac{-6 - [(-3)(3) + (-1)(-2)]}{1} = 1$$

The solution vector x has been obtained as follows:

$$x = \begin{bmatrix} 1 \\ -2 \\ 3 \end{bmatrix}$$

In a further embodiment of the invention, the methods of embodiments 1 and 2 have been combined to obtain a reduction in the processing time required to find the solution. This embodiment is particularly applicable for solving linear equation systems having right hand sides lower than the dimension of the matrix. The combination comprises processing a selected number of rows of the extended matrix by applying method 2, and processing the remaining rows of the matrix by applying method 1. This procedure decreases the number of division operations required to process the matrix, thus speeding up calculations and shortening the time required by the computer to perform the calculations.

Also, in method one, it is possible to perform steps 106 and 110 in the same section of the process, provided that $a_{ee}$ is not zero, and thus obtaining a normalized row in step 106. This would make step 110 unnecessary, since the row would already be normalized.

The method of the invention was tested to determine the amount of time saved in solving linear equations systems of different sizes, as compared with the widely used LAPACK (Linear Algebra Package) method (developed under NSF Grant No. ASC-9313958 and DOE Grant No. DE-FG03-94ER25219, and available through the internet web). The improvement in speed of the method of the invention may be attributed, without intending to link the invention merits to this particular explanation, to: (1) the number of operations required is reduced to a minimum; (2) the number of memory accesses, read and write operations to computer memory, is minimized; and (3) the faster dot product computation techniques.

Figure 3:
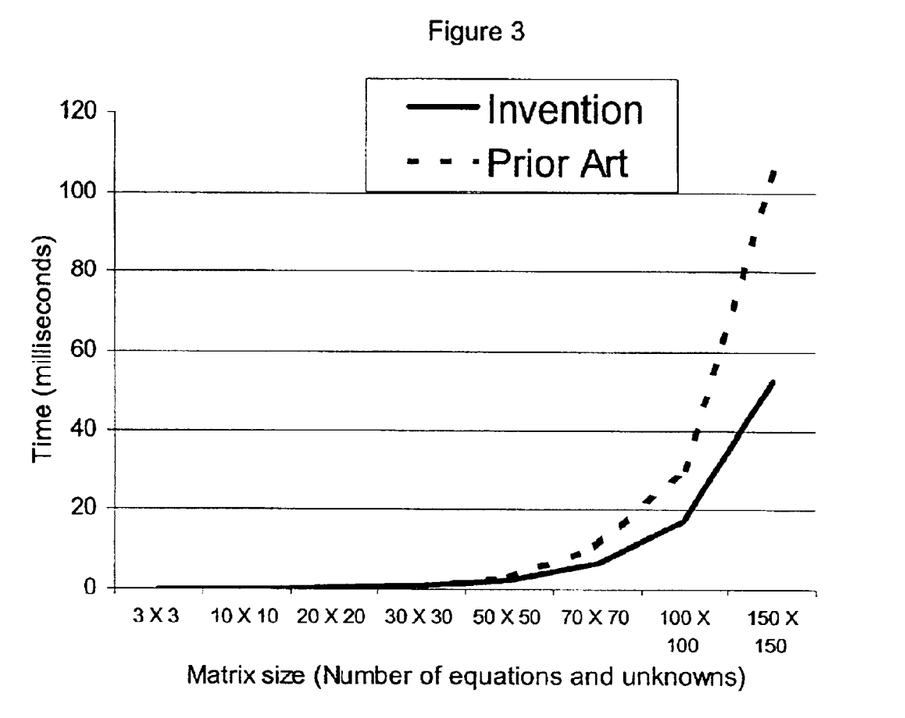
FIG. 3. shows a graph illustrating a comparison of the processing time required for a computer programmed according to the second embodiment of the invention with a standard prior art method for solving different sized linear equation systems.

As illustrated in FIG. 3, as the variable N, representing the size of the linear equation system (N equations, N unknowns), increases from 30 to 100; the processing time required by the computer increases considerably, from about 8 milliseconds to about 38 milliseconds. When N is raised to 150, the time consumed by the computer reaches 150 milliseconds. If the same equations systems are solved with the method of the invention, the time is reduced in about 10 to 60% of the time taken by the prior art method. The same algorithm of triangularization and back substitution described above for solving a set of linear equations is applied for calculating the inverse of a matrix [A]. In this case, the extended matrix is formed by the matrix [A] and the identity matrix [I]. The difference comes at the back-substitution stage where the following formula is used:

$$a_{ij} = a_{ij} - \sum_{j=i+1}^{n} a_{ij}$$

for i=n−1, n−2, . . . 1.

The present invention also comprises a programmed storage medium with code related to the calculation of the dot product of two given one-dimensional vectors. Typically the computers are programmed to perform one multiplication and one addition (of the result of such multiplication to the variable accumulating the result of the dot product) and this instruction is repeated as many times as elements conform with the vectors. The applicants have surprisingly found that programming the computer in such a way that a number of multiplication and addition operations are performed through one line of code, and accumulating the partial results of the group of operations, the time consumed by the computer in calculating the dot product is significantly shortened.

Figure 4:
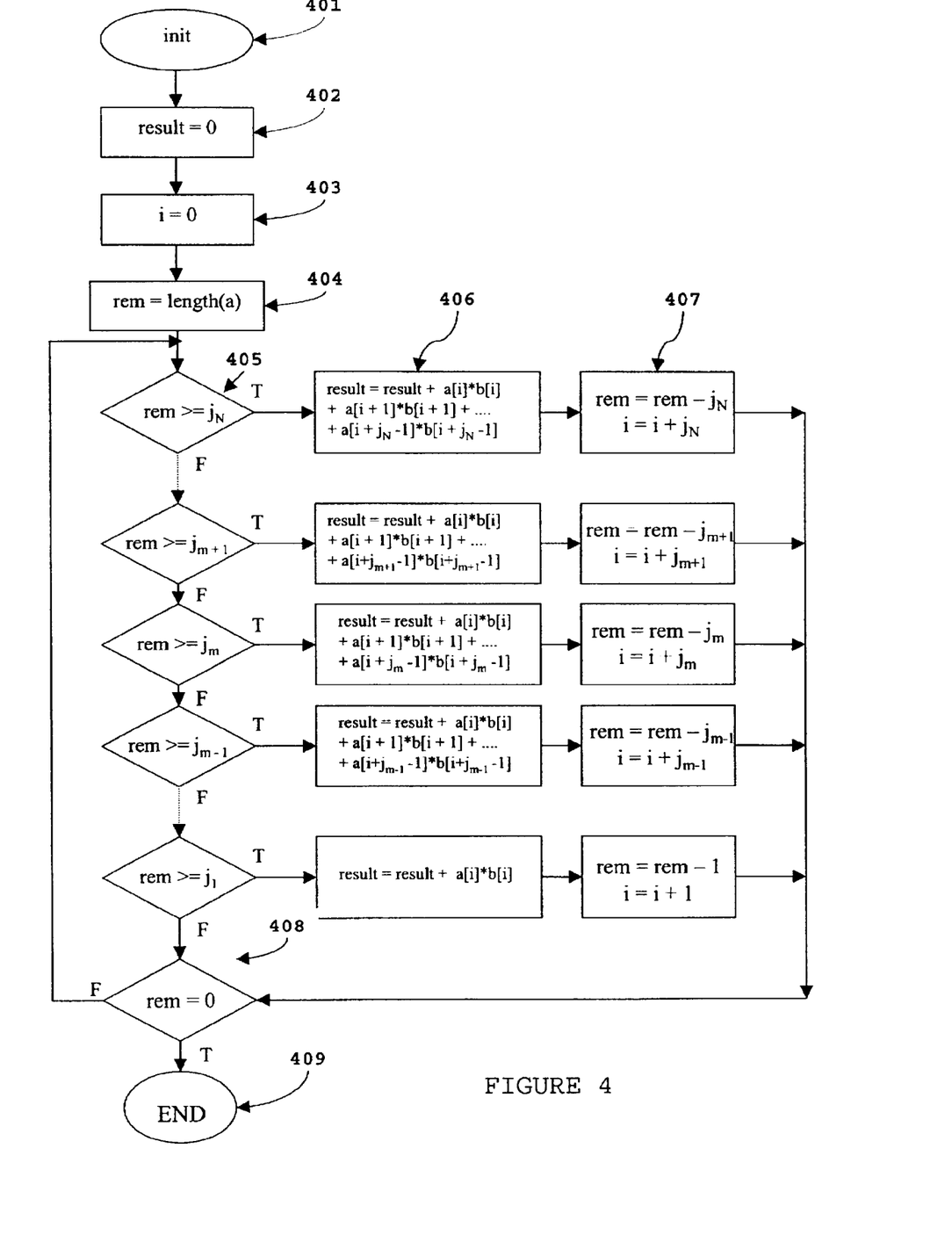
FIG. 4 shows a flowchart of another preferred method of the invention for calculating the dot product of two vectors in fewer calculations than the methods of the prior art.

Referring now to FIG. 4, the operations involved in the calculations of the dot product of two vectors [a] and [b] of size m, where each element of the vectors is represented as a[i] and b[i] respectively, i being a positive real integer, are as follows:

The first step of the calculations involves the selection of a group J. This group is formed by at least two N real integer values, one of which is always 1, and the rest being calculated according to the following considerations:

$j_1=1$ $j_n=j_n|j_{n-1}<j_n\leq(j_n+5000)2\leq n\leq N$

As an example, some valid J sets are described below. It has been found that selecting consecutive numbers for the first few elements of J increases performance of the method, however this is not necessary for implementation of the method. In one of the preferred embodiments of the invention the set J is comprised of 10 elements: 1, 2, 3, 4, 5, 6, 7, 8, 16 and 32.

J={1,6,12,25,50,100}

J={1,2,3,4,5,6,12,25,50,100}

J={1,2,4,8,16,32,64}

J={1,2,3,4,5,6,7,8,16,24,32,64,128}

Once the group has been selected we can begin the calculation of the dot product. Operations 402, 403 and 404 involve the initialization of the various variables that will be used through the procedure. The variable result will hold the partial and eventually final result. The variable i will indicate the vector element which is being currently processed. Variable rem will hold the total number of elements to be processed through the procedure. This variable is initialized with the number of elements or size of the vectors to be processed.

Operations 405 through 407 are the core calculations of the method. This instructions are repeated for as long as there are elements remaining to be processed. For each element of set J there exists a subset of instructions 405–407. Instruction 405 deals with the comparison of the number of remaining elements and the number of multiply-add operations indicated by j. In the case in which the number of remaining elements is lower than the current j, the subset of instructions 405–407 is accessed. Otherwise, instruction 406 of the current subset is executed. Instruction 406 deals with the j multiply-add operations and storing in the result variable; e.g. if j=3, instruction 406 would perform the following operation:

result=result+a[i]*b[i]+a[i+1]*b[i+1]+a[i+2]*b[i+2]

Instruction 407 deals with the actualization of variables rem and i. Variable rem is actualized by subtracting j from rem's previous value. Variable i is actualized by adding j to its value.

After one of the subset of operations 405 through 407 has been executed, operation 108 compares the value of rem with zero. If the comparison result is false, flow control returns to the start comparison 405. Otherwise, the dot product has been calculated and the method ends (operation 109).

The previously described method can be used in different and varied applications. In particular, this novel method can be used during the triangularization or back substituting processes of the aforementioned method for the solution of linear equation systems and calculation of the inverse of a matrix.

With simple modifications, the aforementioned method can be applied to the calculation of a sum of products or quotients of multiple vector elements, constants or functions thereof. This is done by modifying instruction 106 of the previously described algorithm by including in the multiply-add operation the extra multipliers/dividers. i.e. result= result+a[index]*b[index]*c[index]+a[index+1]*b[index+1] *c[index+1]+ . . . a[index+j−1]*b[index+j−1]*c[index+j−1]. These modifications are commensurate with the spirit and scope of the invention, which can be summarized as calculating multiple multiply/divide-add operations in a single step of the programming code.

Figure 5:
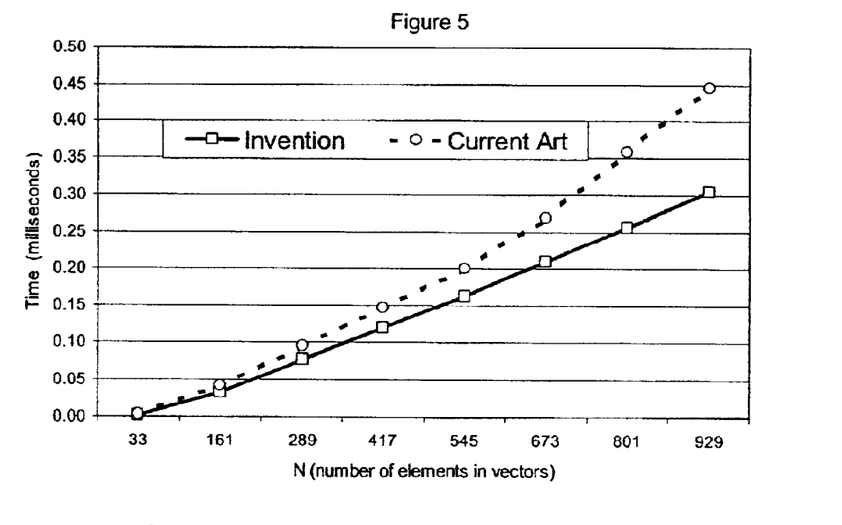
FIG. 5 shows a graph illustrating a comparison of the processing time required for a computer programmed according to the method of FIG. 4 with a prior art method to calculate the dot product of two vectors having an increasing number of elements.

Referring now to FIG. 5 which depicts a time performance comparison between the current art and the aforementioned dot product calculation method, a comparison is made by applying an embodiment consisting of a set J holding 10 different elements: 1,2,3,4,5,6,7,8,16 and 24.

In FIG. 5, the dot product calculation method of the present invention was performed on a programmed general-purpose computer system, for pairs of vectors having an increasing number of elements. The time used by the computer in calculating the dot product is about 64% to about 82% of the time consumed by the same computer programmed in a well-known method of the prior art.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed is:

1. A computer method of solving a system of linear equations of the general form [A][X]=[B], by means of a digital computer, comprising the steps of:

(a) representing the linear equations system in said digital computer in the form of an extended matrix [A|B], formed by N×N+1 elements $a_{ij}$, which are indexed as an arrangement of N rows and N+1 columns;

(b) selecting a first row of elements of said matrix having a first element different from zero;

(c) normalizing the values of the elements of said first row by dividing all elements of said first row by the value of the first non-zero element;

(d) setting the initial value of a first index "e", associated with the sequential order of selection of the rows, to 2;

(e) selecting a second row of said matrix;

(f) calculating the values of the elements of a transformation vector [K] according to the formula:

$$K_n = \begin{cases} 1 \leq n < e; & -a_{en} - \sum_{i=1}^{n-1}(a_{in} * K_i) \\ n = e; & 1 \end{cases}$$

where "n" is a second index associated with the sequential order of the n-th element of the vector [K] being calculated and "e" is said first index associated with the sequential index of the row being transformed;

(g) transforming the values of each of the elements of the selected second row by performing the dot product of said vector [K] and a vector formed by those "e" elements of each column of the extended matrix [A|B] corresponding to the rows that have been transformed prior to the selection of said second row;

(h) determining whether element $a_{ee}$ of matrix [A|B] is zero;

(i) if element $a_{ee}$ is zero, then determining whether index "e" is equal to the number of columns "n"; If $a_{ee}$ is not zero, then modifying the value of said index "e" so that another row of said extended matrix is selected;

(j) selecting a third row of said extended matrix and repeating steps (f) to (h) until a row is found with a nonzero element $a_{ee}$;

(k) normalizing row "e" by dividing all elements of row "e" by the value of said element $a_{ee}$;

(l) determining from the value of said first index "e" whether all rows of said matrix have been transformed; if all rows have not been transformed, then modifying the value of said index "e" so that another row of said extended matrix is selected;

(m) repeating steps (e) to (j) until all rows of said matrix have been transformed; thereby obtaining an upper diagonal matrix [U] with all elements $u_{ij}$ located in the main diagonal having a value of 1, and all elements below the main diagonal having a value of zero; and (n) sequentially back-substituting the value of the nth element of vector [x] according to the following formula:

$$x_i = \frac{\left(b_i - \sum_{j=i+1}^{n} u_{ij} x_j\right)}{u_{ii}}$$

for i=n−1, n−2, . . . 1; whereby the calculated vector [x] is the solution vector of the original system of linear equations.

2. A computer method of solving a plurality of systems of linear equations by means of a digital computer according to claim 1, wherein an extended matrix [A|] is formed by said first matrix [A] and a second matrix [B] formed by multiple values of said vector [B].

3. A computer method according to claim 1, wherein a strict order of columns is not followed in the calculation process.

4. A computer method according to claim 1 wherein said matrix [A] is transformed into a lower triangular matrix [L] with all elements $l_{ij}$ located in its main diagonal having a of 1, and all elements above its main diagonal having a value of zero.

5. A computer readable storage medium containing computer readable code for operating a computer to perform a method according to claim 1.

6. A computer method of solving a system of linear equations by means of a digital computer, comprising the steps of:

(a) representing the linear equations system in said digital computer in the form of an extended matrix [A|B], formed by N×N+1 elements $a_{ij}$, which are indexed as an arrangement of N rows and N+1 columns;

(b) selecting a first row of elements of said matrix having a first element different from zero;

(c) normalizing the values of the elements of said first row by dividing all elements of said first row by the value of the first non-zero element;

(d) setting the initial value of a first index "e", associated with the sequential order of selection of the rows, to 2;

(e) selecting a second row of said matrix;

(f) calculating the values of the elements of a transformation vector [K] according to the formula:

$$K_n = \begin{cases} 1 \leq n < e; & -a_{en} - \sum_{i=1}^{n-1}(a_{in} * K_i) \\ n = e; & 1 \end{cases}$$

where "n" is a second index associated with the sequential order of the n-th element of the vector [K] being calculated and "e" is said first index associated with the sequential index of the row being transformed;

(g) calculating the value of the element $a_{ee}$ of said matrix by performing the dot product of said vector [K] and a vector formed by the "e" elements of each column of the extended matrix [A|B] corresponding to the rows that have been transformed prior to the selection of said second row;

(h) determining whether the element $a_{ee}$ of matrix $[A|B]$ has a non-zero value;

(i) if element $a_{ee}$ is zero, then determining, from the value of said first index "e", whether all columns of the matrix have been transformed; If all columns have not been transformed, then selecting another row of said extended matrix and repeating steps (f) to (h) until a row is found with a non-zero valued element $a_{ee}$;

(j) recalculating the values of the elements of a transformation vector [K] according to the formula:

$$K_n = \frac{K_n}{a'_{ee}} \quad 1 \le n \le e$$

where "n" is an index associated with the n-th element of vector [K] being calculated and "e" is an index associated with the sequential index of the row being transformed;

(k) transforming the values of each of the elements of said second row by performing the dot product of said vector [K] and a vector formed by the first "e" elements of each column of the extended matrix $[A|B]$;

(l) determining from the value of said first index "e" whether all rows of said matrix have been transformed; if all rows have not been transformed, then modifying the value of said index "e" so that another row of said extended matrix is selected;

(m) repeating steps (f) to (j) until all rows of said matrix have been transformed; thereby obtaining a transformed upper diagonal matrix [U] with all elements $u_{ij}$ located in the main diagonal having a value of 1, and all elements below the main diagonal having a value of zero; and (n) sequentially back-substituting the value of the nth element of vector [x] according to the following formula:

$$x_i = \frac{\left(b_i - \sum_{j=i+1}^{n} u_{ij} x_j\right)}{u_{ii}}$$

for i=n−1, n−2, . . . 1; whereby the calculated vector [x] is the solution vector of the original system of linear equations.

\* \* \* \* \*